United States Patent

Romanelli

[15] 3,640,455
[45] Feb. 8, 1972

[54] AIR TEMPERATURE CONTROL SYSTEM

[72] Inventor: Pat Romanelli, Harrington Park, N.J.

[73] Assignee: Ram Domestic Products Company, Northvale, N.J.

[22] Filed: Feb. 6, 1970

[21] Appl. No.: 9,339

[52] U.S. Cl. .................... 236/49, 236/74, 318/223
[51] Int. Cl. ......................................... F24f 7/04
[58] Field of Search ................ 236/1 B, 1 C, 11, 74

[56] References Cited

UNITED STATES PATENTS

| | | | |
|---|---|---|---|
| 2,188,775 | 1/1940 | Locke | 236/1 B |
| 2,273,992 | 2/1942 | Robb | 236/1 B UX |
| 2,533,175 | 12/1950 | Newton | 236/1 C |
| 2,572,136 | 10/1951 | Greenlee | 236/74 X |
| 3,170,629 | 2/1965 | Berger | 236/1 C |
| 3,251,548 | 5/1966 | Foster | 236/1 C |

*Primary Examiner*—Edward J. Michael
*Attorney*—Edward F. Levy

[57] ABSTRACT

A multizone room air temperature control system comprises a thermostatically controlled louvered vent unit fitted to the mouth of the preexisting air duct register of the heating and air-conditioning system, in each room whose temperature is to be controlled. A continuously energized reversible shaded pole motor connected to the thermostat automatically opens and closes the vent louvres in response to room air temperature changes to thereby introduce or shut off the supply of either warm or cold air into the room for regulating the room air temperature independently of the other rooms.

3 Claims, 6 Drawing Figures

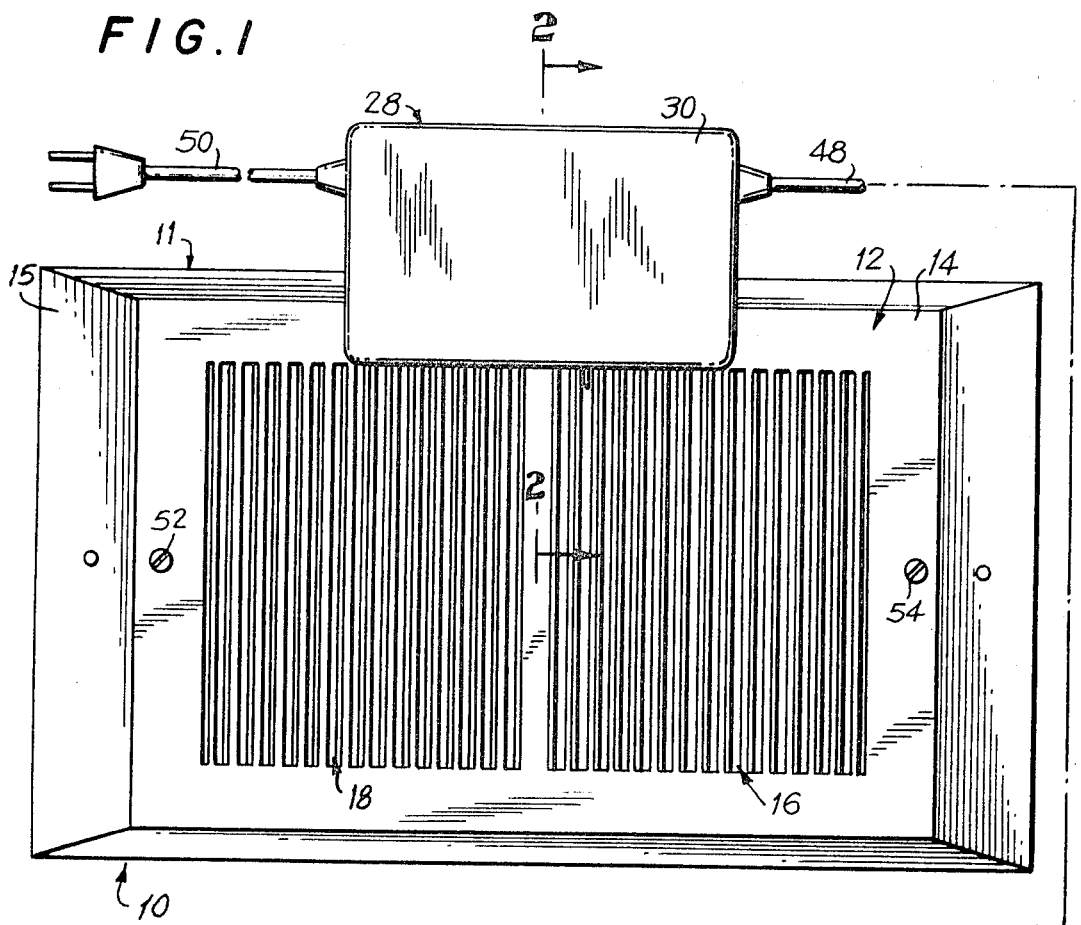
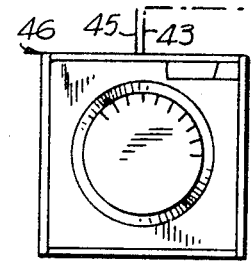
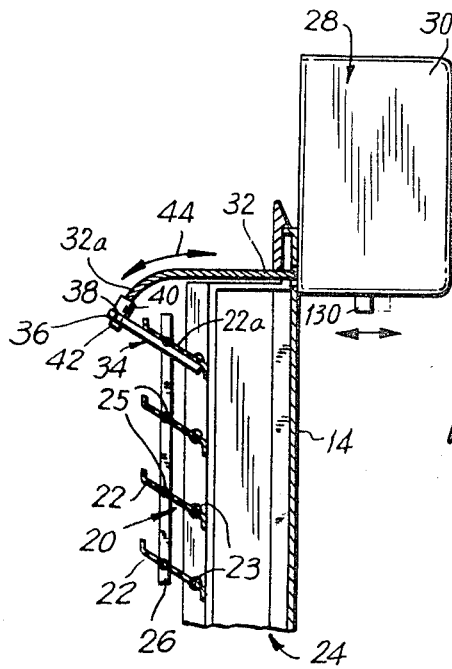
FIG.1
FIG.2
INVENTOR.
PAT ROMANELLI
BY Edward F. Levy
ATTORNEY

INVENTOR.
PAT ROMANELLI

BY Edward F. Levy

AIR TEMPERATURE CONTROL SYSTEM

The present invention relates to thermostatic controls, for heating and air conditioning systems and more particularly to systems for selectively and automatically controlling the flow of air to the various zone areas in a heating and air-conditioning system.

In a typical forced air system providing central heating and air conditioning there is provided individual ducts each terminating in a damper or louvre for controlling the air flow into the various zone areas such as the individual rooms of a house. In such conventional systems, the hot air or cold airflow, as the case may be, can be selectively varied by manually adjusting the damper or louvres to thereby regulate the temperature in the room to the desired level. Such known systems usually employ a single central thermostat with the result that due to heat loss in the air ducts, repeated individual manual adjustment of the airflow into each of the various rooms in a house is required in order to obtain the desired temperature. Such repeated manual adjustment of the air flow ducts is cumbersome and at times virtually impossible to maintain, e.g. at night, when the occupant is asleep.

It is therefore an object of the present invention to provide a system for automatically controlling the temperature individually in each of the various zones of a multizone heating and air-conditioning system.

Another object of the present invention is the provision of an automatic control system of the character described which is operative to selectively open and close the vents of the various ducts openings into the various zones in said multizone system, in response to changes in temperature within said zones respectively.

Still another object of the present invention is the provision of an automatic control system in accordance with the foregoing objects wherein said vents are motor driven.

A further object of the present invention is the provision of an automatic control system in accordance with the foregoing objects having means for automatically adapting the system for summer and winter conditions respectively. As referred to hereinafter, "winter" conditions means such weather conditions where the supply of air from the air ducts into the room to be controlled is heated, and "summer"] conditions mean conditions where the air supply in the ducts is "air-conditioned," i.e. cooled.

In accordance with the principles of the present invention there is provided an air temperature control system for individually controlling the air temperature of each of a plurality of rooms. The system comprises at least one selectively operable air vent in each of the rooms, which is connected to the mouth of an air duct providing a supply of air at a controlled temperature into these rooms respectively, and thermostat means for sensing the air temperature in each of the rooms and for providing a first signal when the air temperature exceeds a first preselected temperature level and a second signal when the air temperature drops below a second preselected temperature level. The system of the present invention further includes drive means operative in response to the first and second signals to selectively open and close the vents, thereby controlling the flow of the temperature-controlled air supply through the ducts into the rooms respectively for maintaining the air temperature in each of the rooms in the range between the first and second temperature levels.

Additional objects and advantages of the present invention will become apparent during the course of the following specification when taken in connection with the accompanying drawings, in which:

FIG. 1 is a plan view of an air temperature control unit in accordance with the present invention, for installation in each of the rooms whose air temperature is to be controlled;

FIG. 2 is a sectional view taken along the line 2—2 in FIG. 1;

Figure 3:
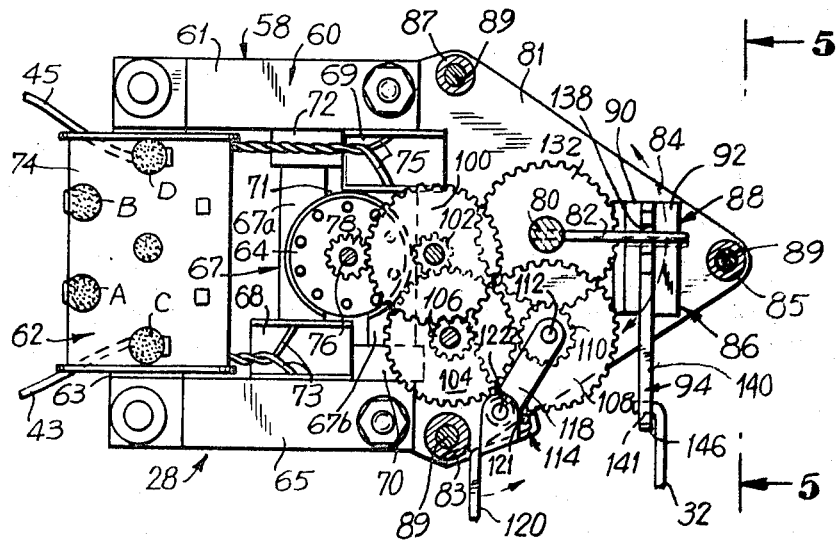
FIG. 3 is a top plan view of the motor unit of the present invention with a portion thereof broken away to reveal the gearing arrangement employed.

Referring in detail to the drawings, and in particular to FIGS. 1 and 2, there is shown a duct vent control unit 10 made in accordance with the present invention. The temperature control system of the invention comprises a plurality of control units 10, each of which is intended to be mounted in a separate room fed by a central heating and/or air-conditioning system.

The unit 10 includes a selectively operable vent assembly 11 sized to be fitted to a standard duct opening (not shown) to replace the usual fixed register vent, and a thermostat 46 for automatically controlling the vent assembly 11. The thermostat 46 is adapted to be mounted separately within the room at a location which may be remote from the vent assembly. The unit 10 also includes a motor unit 28 for opening and closing the vent assembly 11, the motor unit 28 being enclosed in a boxlike housing 30 fixedly mounted on the upper portion of the vent assembly 11.

The duct vent assembly 11 comprises a rectangular mounting plate 12 having a peripheral flat frame portion 14 enclosing a pair of grilles 16 and 18 respectively vent oriented to the right and left directions. The assembly 11 may be provided with a mounting frame 15 for fitting mounting plate 12 to the duct opening (not shown).

Fixedly mounted rearwardly of, and spaced from mounting plate 12, is a selectively operable multislatted "venetian blind"-type louvre assembly 20. Thus the vented openings provided by louvre assembly 20 communicate with the forward fixed vent grilles 16 and 18. Louvre assembly 20 comprises a plurality of horizontal louvres 22 rotatably mounted at their opposite ends by pivots 23 between a pair of spaced, vertically disposed mounting brackets 24 fixedly secured to the back surface of mounting frame 14. Each of louvres 22 making up assembly 20, is mounted by a pivot 25 to a linking member 26, so that rotation of any one of louvres 22 with respect to mounting brackets 24 will cause similar rotation of all louvres 22 in unison, due to their interconnection through linking member 26.

Rotation of louvres 22 is achieved through the action of motor unit 28 enclosed in boxlike housing 30 which is fixedly mounted to the upper horizontal portion of frame 14, in the following manner: A flexible cable 32 is connected at one end to the uppermost louvre 22a by means of an elongated lug 34 secured at one end to louvre 22a and projecting outwardly beyond louvre 22a in the form of a tab 36. The end 32a of cable 32 terminates in a enlarged head 40 which is received in a hole 38 in tab 36, and is secured to said tab by a lockwasher 42.

The other end of cable 32 is secured to motor unit 28, whereby cable 32 is extended from, and retracted into housing 30 as indicated by arrow 44, in response to the action of thermostat 46 hereinafter described in detail, whereby vent slats 22 open and close to permit ventilation of air therethrough in response to temperature changes in the room.

The thermostat 46, shown in FIG. 1, is of the selectively-variable type which can be manually adjusted to operate at desired room temperatures. The thermostat 46 is adapted to be mounted on the wall of a room, and is connected to motor unit 28 by means of electrical cable 48 through one side of motor unit housing 30. Motor unit 28 may be suitably connected to an ordinary household 110 VAC supply by means of electrical cable 50 extending through the other end of motor unit housing 30. The complete vent assembly 11 may be mounted on a wall bordering a duct opening, by means of a pair of screws 52 and 54 which mount frame portion 14 and its surrounding mounting frame 15 to the wall surface respectively. Thus, when vent assembly 11 is in the mounted position, the opening of the air duct (not shown) is in communication with vent louvres 22 and through grilles 16 and 18 into the room whose temperature is being controlled thereby.

Figure 4:
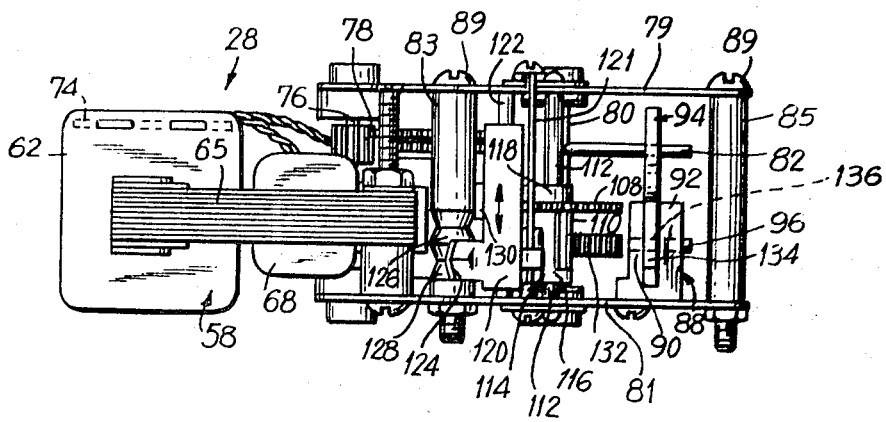
FIG. 4 is a side elevation view of the motor unit of FIG. 3.
Figure 5:
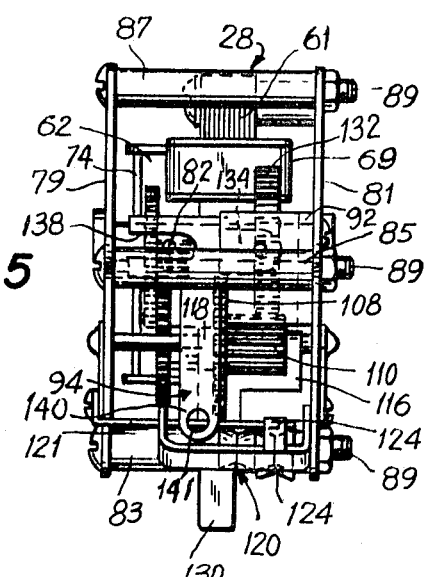
FIG. 5 is a end elevation view of the motor unit of FIG. 3; as viewed along line 5—5 of FIG. 3.

As shown in FIGS. 3–5, motor unit 28 comprises a reversible-type shaded pole motor 58 having a square-shaped iron core yoke 60 with arms 61, 63, 65 and 67. A field winding 62 is wound on yoke arm 63.

Yoke arm 67 comprises a pair of arm sections 67a and 67b defining a central cylindrical gap 71 therebetween for receiving motor rotor 64, with a pair of shading coils 68 and 69 being wound on the opposite ends of arm sections 67a and 67b at diagonally opposite sides of rotor 64. There is further provided shading rings 70 and 72 on the ends of arm sections 67b and 67a respectively adjacent to and associated with shading coils 68 and 69.

A terminal plate 74 made of insulator material is mounted on field winding 62 and includes a pair of input terminals A and B and a pair of terminals C and D respectively connected to shading coils 68 and 69 by leads 73 and 75. The action of reversible motor 58 is accomplished, as hereinafter described in greater detail by the action of thermostat 46 in jumping and open-circuiting shading terminals C and D by means of thermostat leads 43 and 45 connected thereto.

Rotor 64 is provided with a coaxial shaft 76 affixed to a gear 78 which drives a chain of reducing gears which are mounted between a pair of spaced flat mounting plates 79 and 81 secured together, by spacers 83, 85 and 87 having bolts 89 therethrough. Also mounted between plates 79 and 81 is a gear shaft 80 which has a horizontal cylindrical arm or pin 82 extending perpendicularly therefrom.

Thus, with rotation of shaft 80 about its own axis, arm 82 sweeps an arc in the horizontal plane as indicated by direction arrow 84.

There is further provided a pivot assembly 86 comprising a base guide piece 88 fixedly secured to bottom mounting plate 81 and having a pair of closely spaced vertical guide walls 90 and 92. A pivot lever 94 is mounted for arcuate movement between guide walls 90 and 92 by means of a hinge pin 96.

Figure 6:
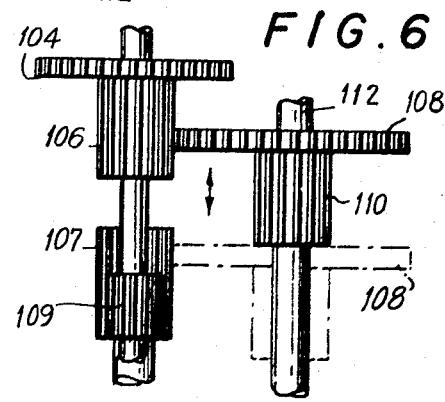
FIG. 6 is side elevation view of a portion of the gearing arrangement of FIG. 3 showing the gear reversing means employed.

Rotation of rotor 64 in response to the action of the control circuitry associated with thermostat 46, causes the rotation of shaft 80 and arm 82, in the following manner. Pinion 78 on rotor 64 drives gear 100 whose pinion 102 drives gear 104. Pinion 106 of gear 104, in turn drives gear 108. Gear 108 and its associated pinion 110 may be selectively slidably raised and lowered on pin 112 therethrough by means of a selector assembly 114 which comprises bracket arms 116 and 118 which respectively bracket the top of gear 108 and the bottom of pinion 110 and which are slidably mounted on pin 112. This slidable movement of bracket arms 116 and 118 is accomplished by means of selector arm 120 which itself is slidably mounted on pin 122 and which is adapted to engage the free ends of arms 116 and 118. Selector arm 120 may be selectively locked in either of two vertical positions by means of key finger 124 which may conformably engage either of U-shaped recesses 126 and 128 on spacer 83. Key finger 124 is retained in either of recesses 126 and 128 by virtue of rotational spring pressure applied to selector arm 120 by means of wire spring 121. Arm 120 is provided with a finger 130 which projects from housing 30, as shown in FIG. 2, for manually rotating arm 120 against the spring pressure and for sliding arm 120 up and down on pin 122. Selector assembly 114 is operative, by raising and lowering gear 108 and pinion 110, to have gear 108 engage either pinion 106 directly in raised position, or when lowered to engage an idler pinion 107 (FIG. 6) which engages pinion 109 located at the bottom end of the shaft carrying pinion 106. In this way gear 108 will, for a constant direction of rotation of rotor 64, rotate in either the clockwise or counterclockwise direction depending on the position of selector arm 120, as explained hereinabove. Pinion 110 engages gear 132 affixed to shaft 80. Accordingly, the position of selector arm 120 will determine the direction of rotation of arm 82, in response to the rotation of rotor 64.

Pivot lever 94 comprises a base portion 134 having an aperture 136 through which hinge pin 96 passes to allow the pivoting movement of lever 94. Pivot lever 94 terminates at its upper end in a U-shaped slot 138 which slideably receives pin 82 therethrough. Lever 94 further comprises a horizontally extending lever arm 140 having a through aperture 141 at the free end thereof for the attachment thereto of flexible cable 32, which, as noted hereinabove produces rotation of louvres 22. Thus, rotation of motor rotor 64, through the action of the above described gear train, pivot assembly 86, and cable 32, will open or close vents 22 depending on the position of selector arm 120.

Suitable stop means (not shown) within housing 30 limits pivoting movement of the lever arm 140 in both directions, the limit positions of lever arm 140 being 90° apart and corresponding to the completely open and completely closed position of louvres 22. Motor 58 which is of the shaded pole type, having a line input at terminals A and B, remains continuously energized during operation of the control system of the present invention, but is in a stalled condition when lever 94 is at either of its opposite limit positions. In operation, continuously energized motor 58 is reversed by making and breaking the connection between the pair of control leads 43, 45 leading from thermostat 40 to motor terminals C and D.

Motor shading coils 68 and 69 are connected in series and are in transformer relationship with field winding 62. The thermostat output leads 43 and 45 of cable 48 are respectively connected to terminals C and D which are the end terminals of the series arrangement of shading coils 68 and 69. Thermostat 46 is operative, when connected to shading coils 68 and 69 as indicated above, to complete the series circuit of shading coils 68 and 69 by jumping terminals C and D when the temperature rises above a preselected level and to open the shading coil series circuit, thereby removing the shading effect of coils 68 and 69, when the temperature drops below a preselected level.

In operation, the field created by field winding 62 biases rotor 64 to rotate in a clockwise direction, whereas the combined field created by shading coils 68 and 69, when energized, biases rotor 64 to rotate in a counterclockwise direction.

Since the combined field of shading coils 68 and 69 is greater than the field created by main winding 62, when shading coils 68 and 69 are energized, rotor 64 will rotate in the counterclockwise direction. With selector arm 120 in the winter position (i.e., in upper recess 126), such counterclockwise rotation of rotor 64 causes louvres 22 to rotate toward the closed position until they reach the fully closed position, at the limit position of lever arm 140. When so limited in further rotation, motor 58 will go into a stalled condition, whereby coils 62, 68 and 69 remain fully energized and louvres 22 remain urged into abutment with bracket 24, to thereby retain louvres 22 in the firmly closed condition.

When the room temperature drops below the preselected level of thermostat 46, the latter will open-circuit the connection between leads 43 and 45 connected to end terminals C and D of shading coils 68 and 69 and thereby eliminate their field, tending to rotate rotor 64 in the counterclockwise direction. This action leaves only the field created by main winding 62, which as indicated above, tends to rotate rotor 64 in the clockwise direction. Accordingly, when under the sole influence of main winding 62, rotor 64 will rotate in the clockwise direction whereby louvres 22 will open to the fully opened position as indicated in FIG. 2. The length of cable 32 is selected so that when cable 32 is fully extended by lever 94, (which is then in the horizontal position), louvres 22 will be in the fully opened position of FIG. 2 allowing warm air to flow into the room. Thus, the length of cable 32 will also serve to limit any further clockwise rotation by rotor 46, and motor 58 will thus be rendered into the stalled condition and will remain in such stalled condition until further action by thermostat 46, as follows.

When the room temperature rises above a preselected level, thermostat 46 will then jump the connection between shading coil end terminals C and D thereby allowing current to flow through the series arrangement of shading coils 68 and 69, whereby coils 68 and 69, which are in transformer relationship with main winding 62, are energized. As indicated above, the field thus produced by shading coils 68 and 69 applying a counterclockwise torque on rotor 64, overrides the clockwise torque thereon produced by main winding 62, whereby rotor 64 experiences a resultant counterclockwise torque. In response thereto, rotor 64 rotates counterclockwise, again causing louvres 22 to close.

The air temperature control system of the present invention as just described for the "winter" condition may be set for "summer" conditions, merely by moving selector arm 120 downwardly from slot 120 to slot 128. For a given direction of rotation of rotor 64, rotation of shaft 80 is reversed and hence louvres 22 will rotate in a direction opposite to that described hereinabove when selector arm 120 is in the "winter" slot 126. Then in the summer condition, louvres 22 will open allowing cool air to enter the room when the temperature rises above a first preset level and will close when the temperature drops below a second preset level.

From the foregoing it is clear that the air temperature control system of the present invention is advantageous over presently known systems in that the air temperature of each room controlled thereby is regulated independently of all the other rooms, thus allowing the occupant to maintain the various rooms at different air temperatures, if desired, Furthermore the present control system overcomes the errors inherent in conventional air heating or air conditioning systems where undesirable variations in room air temperature occur due to the natural upward movement of warmed air and also due to variations in the building insulation and outside ambient temperatures at different locations within the dwelling.

Furthermore, the use in the present invention of a continuously energized reversible shaded pole motor as the means for drawing the louvres into the open and closed positions, enables the present system to respond almost instantaneously to variations in room temperature, whereby the shorting or open-circuiting of the thermostat control leads instantaneously causes motor 58 to reverse direction to open or close vents 22 and thereby provide very close regulation of the room air temperature.

It is apparent that the materials, components and construction of the present air temperature control system is very economical when compared with the complex control system that it otherwise necessary in order to provide room-by-room air temperature control for heating and air-conditioning systems.

While preferred embodiments of the invention have been shown and described herein, it is obvious that numerous omissions, changes and additions may be made in such embodiments without departing from the spirit and scope of the invention.

What is claimed is:

1. An air temperature control system for individually controlling the air temperature of each of a plurality of rooms comprising at least one selectively operable air vent in each of said rooms connected to the mouth of a preexisting air duct providing a supply of air at a controlled temperature into each of said rooms respectively, thermostat means for sensing the air temperature in each of said rooms and for providing a first signal when the air temperature exceeds a first preselected temperature level and a second signal when said air temperature drops below a second preselected temperature level, and drive means comprising a continuously energized reversible electric motor operative in response to said first and second signals to selectively open and close said vents thereby controlling the flow of said temperature controlled air supply through said ducts into said rooms respectively to thereby maintain the air temperature in each of said rooms in the range between said first and second temperature levels, said motor including a rotor, main field winding means producing a continuous torque on said motor in one direction and a pair of shading coils producing a continuous torque greater than said main field winding torque on said rotor in a direction opposite to said one direction to produce a continuous net torque on said rotor in said opposite direction, means for applying said continuous net torque on said rotor to said air vent, and mechanical stop means to limit the travel of said air vent in response to the application thereto of said continuous net torque.

2. A control system according to claim 1 including means operative in response to said thermostat first signal to jumper said pair of shading coils to energize said shading coils and to produce a continuous net torque on said rotor in the direction of said shading coil torque, and means operative in response to said thermostat second signal to open circuit said shading coils to deenergize said shading coils to eliminate the shading coil field and to produce a continuous net torque on said rotor in the direction of said main field winding torque.

3. A control system according to claim 1 wherein said drive means includes a reducing gear train in operative engagement at one end thereof with said rotor, a drive shaft mounting a drive gear and a drive arm projecting perpendicularly from said drive shaft, gear reversing means coupling the other end of said gear train to said drive gear, said gear reversing means including selector means having first and second manually selectable positions, and operative for a constant direction of rotation of said rotor to selectively apply a clockwise drive to said drive gear when said selector means is in said first position and a counterclockwise drive to said drive gear when said selector means is in said second position, and pivot means at one end thereof engaging said drive arm and connected at the other end thereof to said vent to open and close said vent in response to rotation of said drive shaft.

* * * * *